United States Patent
Gresser et al.

(10) Patent No.: US 12,391,299 B2
(45) Date of Patent: Aug. 19, 2025

(54) STEERING COLUMN

(71) Applicants: thyssenkrupp Presta AG, Eschen (LI); thyssenkrupp AG, Essen (DE)

(72) Inventors: Moritz Gresser, Baienfurt (DE); Tim Bayer, Luechingen (CH); Daniel Kreutz, Feldkirch (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 18/628,317

(22) Filed: Apr. 5, 2024

(65) Prior Publication Data
US 2024/0336296 A1    Oct. 10, 2024

(30) Foreign Application Priority Data
Apr. 7, 2023    (CN) .......................... 202310370106.X

(51) Int. Cl.
*B62D 1/19*    (2006.01)

(52) U.S. Cl.
CPC .................................... *B62D 1/192* (2013.01)

(58) Field of Classification Search
CPC ......... B62D 1/192; B62D 1/185; B62D 1/181
See application file for complete search history.

(56) References Cited

U.S. PATENT DOCUMENTS

| | | | | |
|---|---|---|---|---|
| 5,152,627 | A | * | 10/1992 | Arnold .................... B62D 1/185 403/351 |
| 11,370,473 | B2 | * | 6/2022 | Kurokawa ............. B62D 1/185 |

FOREIGN PATENT DOCUMENTS

| BE | 1029836 A1 | 5/2023 |
|---|---|---|
| BE | 1029838 A1 | 5/2023 |
| CN | 103079931 A | 5/2013 |
| CN | 104640758 A | 5/2015 |
| DE | 10 2020 202159 A1 | 8/2021 |
| DE | 102022201101 B3 | 7/2022 |
| DE | 10 2021 202074 A1 | 9/2022 |
| EP | 4442538 A1 * | 9/2024 |

* cited by examiner

*Primary Examiner* — Drew J Brown
(74) *Attorney, Agent, or Firm* — thyssenkrupp North America, LLC

(57) ABSTRACT

The present disclosure relates to a steering column, comprising: a first sleeve, a second sleeve and a gap elimination means. The first sleeve is received in the second sleeve in a telescopic way in a longitudinal direction. The gap elimination means includes an elastic pretensioning element and a wedge-shaped body, the wedge-shaped body having a first wedge-shaped surface and a second mating surface. The gap elimination means further comprises an intermediate element, the intermediate element having a third wedge-shaped surface which abuts the first wedge-shaped surface and has a shape fitted to the shape of the first wedge-shaped surface. The pretensioning element applies a pressing force to the wedge-shaped body via the intermediate element. The steering column according to the present disclosure is capable of stably maintaining a gapless state between the first sleeve and second sleeve, thus preventing noise.

12 Claims, 9 Drawing Sheets

STEERING COLUMN

CROSS REFERENCE TO RELATED APPLICATION

This application is a U.S. Non-Provisional that claims priority to Chinese Patent Application No. CN 202310370106.X, filed Apr. 7, 2023, the entire content of which is incorporated herein by reference.

FIELD

The present disclosure relates to a steering column, in particular to an adjustable steering column for a motor vehicle.

BACKGROUND

The content of this section merely provides background information relevant to the present disclosure, and might not constitute prior art.

A steering column is a component of a steering system that connects the steering wheel to the steering gear. An adjustable steering column is configured to be adjustable in a longitudinal and/or height direction, so that the position of the steering wheel is matched to the driver of the motor vehicle. However, when the steering column is adjusted in the longitudinal and/or height direction, a gap between an inner sleeve and an outer sleeve of the steering column might cause a creaking noise, so a gap elimination means is needed to eliminate the gap between the inner sleeve and outer sleeve.

Existing gap elimination means generally consist of a spring such as a curved plate spring and a wedge-shaped body; the spring applies a pressing force to the wedge-shaped body in the height direction, so that the wedge-shaped body abuts the inner sleeve and thereby eliminates the gap between the inner sleeve and outer sleeve. However, in such a gap elimination means, a force applied to the wedge-shaped body by the inner sleeve will be transmitted back to the spring, causing shifting or deformation of the spring; as a result, the gap elimination means is unable to stably maintain a gapless state between the inner sleeve and outer sleeve.

Thus a need exists to provide a steering column capable of stably maintaining a gapless state between a first sleeve and a second sleeve.

Another objective of the present disclosure is to provide a structurally compact steering column that saves installation space.

BRIEF DESCRIPTION OF THE FIGURES

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
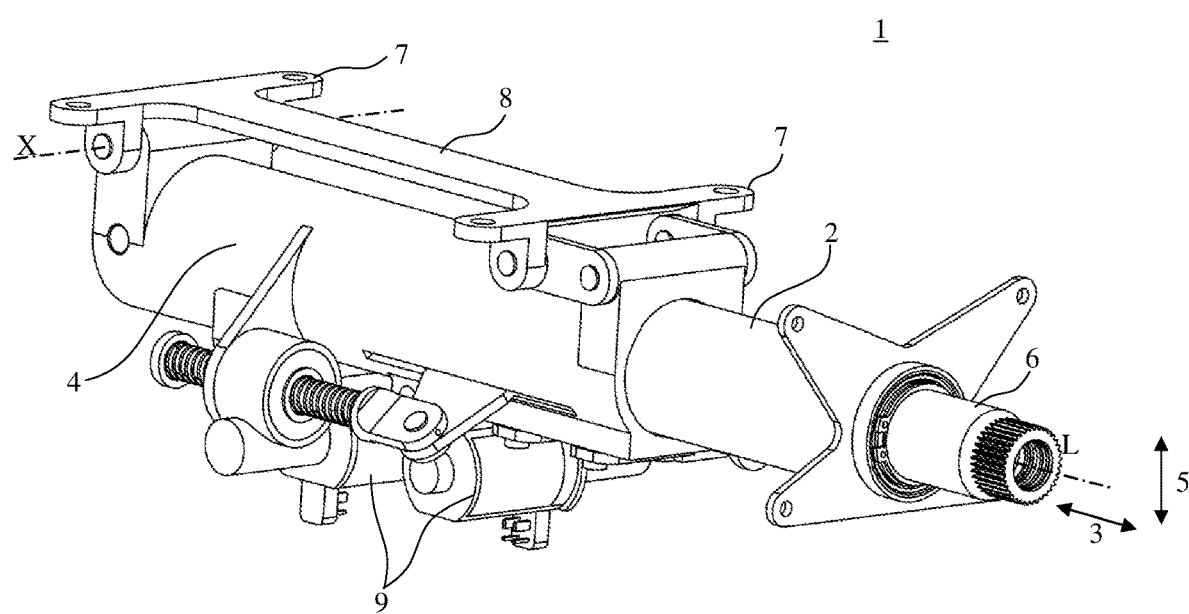
FIG. 1 is a first perspective view showing a steering column according to an exemplary embodiment of the present disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One aspect of the present disclosure provides a steering column, which may comprise: a first sleeve; a second sleeve, the first sleeve being received in the second sleeve in a telescopic way in a longitudinal direction; and a gap elimination means, the gap elimination means comprising an elastic pretensioning element and a wedge-shaped body, the wedge-shaped body having a first wedge-shaped surface and a second mating surface, characterized in that the gap elimination means further comprises an intermediate element, the intermediate element having a third wedge-shaped surface which abuts the first wedge-shaped surface and has a shape fitted to the shape of the first wedge-shaped surface, and the pretensioning element applies a pressing force to the wedge-shaped body via the intermediate element such that the second mating surface of the wedge-shaped body abuts an outer peripheral surface of the first sleeve.

In some embodiments, the elastic pretensioning element may be arranged in a tangential direction of the first sleeve and apply a pressing force to the intermediate element in the tangential direction, and the intermediate element and the wedge-shaped body apply a force to the first sleeve in a radial direction under the action of the pressing force.

In some embodiments, the intermediate element may be provided with a first mating part and the wedge-shaped body may be provided with a second mating part, the intermediate element and the wedge-shaped body being releasably engaged by means of the first mating part and the second mating part, and the first mating part and the second mating part defining a maximum range of movement of the intermediate element and the wedge-shaped body relative to each other.

In some embodiments, the first mating part comprises at least one hook protruding towards the intermediate element, and the second mating part may be formed as a recess, the hook and the recess forming a releasable engagement.

In some embodiments, the gap elimination means may further comprise a cover, and the cover may be formed with an opening that accommodates the elastic pretensioning element and the intermediate element.

In some embodiments, the opening may have a first part formed in the middle, and a second part and a third part respectively located at two sides of the first part, the width of the first part being greater than the width of the second part and the width of the third part in the longitudinal direction, and the intermediate element is provided with a stop part, the width of the stop part being equal to or less than the width of the first part and greater than the width of the second part and the width of the third part.

In some embodiments, the intermediate element comprises a first body part and a second body part arranged in a height direction, the width of the first body part being less than the width of the second part and the width of the third part, and the width of the second body part being greater than the width of the first body part, such that a step face is formed between the first body part and the second body part.

In some embodiments, the step face abuts a lower surface of the cover when the first body part and the second body part of the intermediate element are inserted into the opening of the cover.

In some embodiments, the intermediate element comprises a first intermediate element arranged at a first end of the elastic pretensioning element and a second intermediate element arranged at a second end of the elastic pretensioning element, the second end and the first end being located at opposite sides of the elastic pretensioning element.

In some embodiments, the elastic pretensioning element is formed as a spring, and the first intermediate element and the second intermediate element are each formed with an engagement part which is insertable into a hollow part of the spring.

In some embodiments, the wedge-shaped body comprises a first wedge-shaped body and a second wedge-shaped body connected to each other.

In some embodiments, the gap elimination means is disposed in an opening part of the second sleeve, the opening part being defined by a vertical wall, and the wedge-shaped body also has a third surface, which is formed as a vertical surface and faces the vertical wall.

In the steering column according to the present disclosure, the elastic pretensioning element can apply a pressing force to the wedge-shaped body via the intermediate element with the wedge-shaped surface. Thus, a force applied to the wedge-shaped body by the first sleeve will not be transmitted to the elastic pretensioning element, making it possible to stably maintain a gapless state between the first sleeve and the second sleeve, and thus preventing creaking noises. Further, in the steering column according to the present disclosure, the wedge-shaped body may be connected to the intermediate element, which is connected to the cover by insertion, all of the components being connected to each other in a forward direction; this realizes a maximally flattened design, and a structurally compact gap elimination means is thereby provided, reducing the installation space needed for the gap elimination means and steering column; and a structurally compact steering column is thereby provided.

The following description is essentially only exemplary, and not intended to limit the present disclosure, applications and uses. It should be understood that in all of these drawings, similar reference labels indicate identical or similar components and features. The drawings merely show schematically the concept and principles of embodiments of the present disclosure, and do not necessarily show the specific dimensions and proportions of the embodiments of the present disclosure. Exaggeration may be employed in specific parts of specific drawings to show relevant details or structures of embodiments of the present disclosure.

Figure 2:
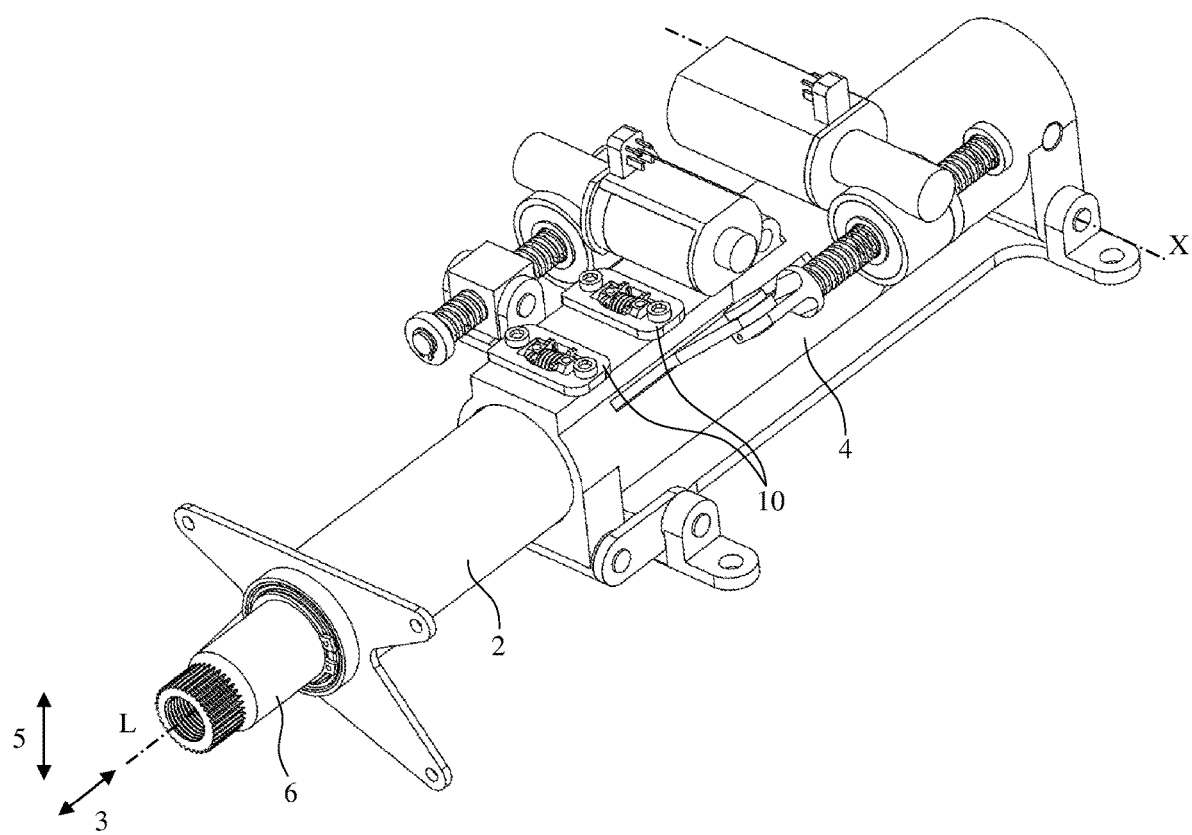
FIG. 2 is a second perspective view showing a steering column according to an exemplary embodiment of the present disclosure.
Figure 3:
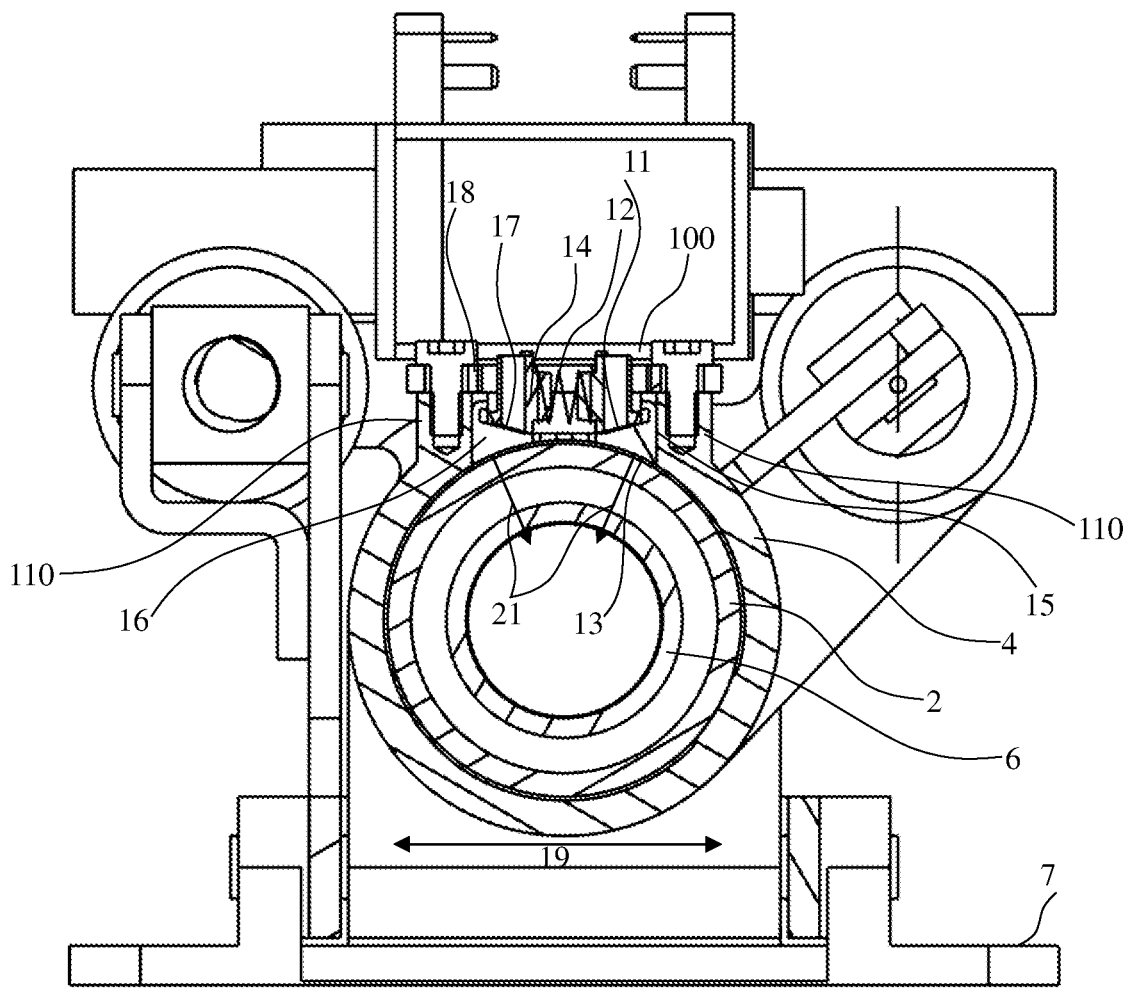
FIG. 3 is a sectional view showing a steering column according to an exemplary embodiment of the present disclosure.
Figure 4:
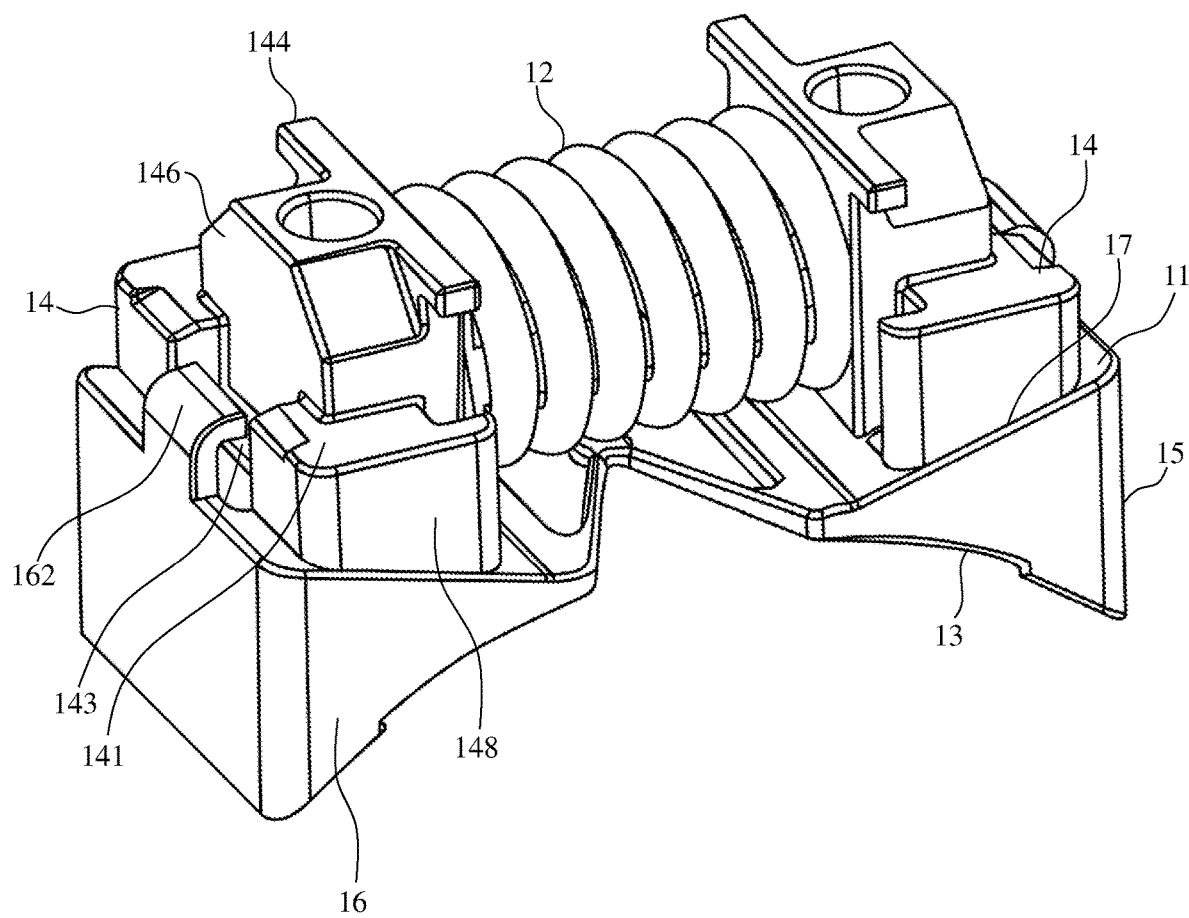
FIG. 4 is a perspective view showing a gap elimination means of a steering column according to an exemplary embodiment of the present disclosure, wherein the cover has been removed to show the internal structure thereof more clearly.

FIGS. 1 and 2 are 3D drawings showing a steering column 1 according to an exemplary embodiment of the present disclosure; FIG. 3 is a sectional view showing the steering column 1 according to an exemplary embodiment of the present disclosure; and FIG. 4 is a 3D drawing showing some of the components of a gap elimination means of a steering column according to an exemplary embodiment of the present disclosure.

As shown in FIGS. 1 and 2, the steering column 1 may comprise a first sleeve 2 (also called an inner sleeve) and a second sleeve 4 (also called an outer sleeve). A steering main shaft 6 is provided in the first sleeve 2, the steering main shaft being installed in the first sleeve 2 in such a way as to be rotatable about a longitudinal axis L. The first sleeve 2 is received in the second sleeve 4 in a telescopic way. The telescopic configuration of the first sleeve 2 with respect to the second sleeve 4, allows the steering column 1 to be adjustable in a longitudinal direction 3. In addition, the first sleeve 2 is adjustable not only in the longitudinal direction 3 but also in a height direction 5 perpendicular to the longitudinal direction. Specifically, the first sleeve 2 is movable in the height direction 5 about a pivot axis X. A steering wheel (not shown) can be connected to the steering main shaft 6, and the adjustability of the first sleeve 2 in the longitudinal and height directions provides the ability of the steering wheel to have its position adjusted relative to the driver.

The steering column 2 may further comprise a carrier unit 8 and a drive unit 9. Specifically, as shown in FIG. 1, the carrier unit 8 comprises a fixing splice 7, by means of which the steering column 1 can be fixed to a body (not shown) of a motor vehicle. Furthermore, the drive unit 9 may comprise a motor, and movement of the first sleeve 2 in the longitudinal direction 3 and the height direction 5 may be adjusted with the aid of the motor.

Referring to FIG. 2, the steering column 1 may further comprise a gap elimination means 10. The gap elimination means 10 may be fastened to the second sleeve 4 by screws for example. As specifically shown in FIGS. 3 and 4, the gap elimination means 10 may comprise an elastic pretensioning element 12, an intermediate element 14 and a wedge-shaped body 16. The wedge-shaped body 16 may be formed with a first wedge-shaped surface 11 and a second mating surface 13. The intermediate element 14 may be formed with a third wedge-shaped surface 17, which has a shape fitted to the shape of the first wedge-shaped surface and abuts the first wedge-shaped surface 11. The elastic pretensioning element 12 applies an action force to the wedge-shaped body 16 via the intermediate element 14, such that the second mating surface 13 of the wedge-shaped body 14 abuts an outer peripheral surface of the first sleeve 2, and applies a pressing force to the first sleeve 2 in the height direction 5, thereby eliminating a gap between the first sleeve 2 and the second sleeve 4. Preferably, the second mating surface 13 may be formed as a substantially wedge-shaped surface.

As shown in FIG. 3, the elastic pretensioning element 12 may be arranged in a tangential direction 19 of the first sleeve 2 and apply a pressing force in the tangential direction 19. The tangential direction 19 may be perpendicular to both the longitudinal direction 3 and the height direction 5.

In the steering column according to an exemplary embodiment of the present disclosure, the first wedge-shaped surface 11 of the wedge-shaped body 16 has a shape fitted to the shape of the third wedge-shaped surface and abuts the third wedge-shaped surface 17 of the intermediate element 14. Thus, the pressing force applied by the elastic pretensioning element 12 in the tangential direction 19 is applied downwards to the first sleeve 2 in radial directions 21 via the intermediate element 14 and the wedge-shaped body 16. That is to say, the elastic pretensioning element 12 applies the pressing force to the wedge-shaped body and the first sleeve via the intermediate element 14, rather than directly applying the pressing force to the wedge-shaped body and the first sleeve. Thus, a reaction force applied to the wedge-shaped body 16 by the first sleeve 2 will not be transmitted to the elastic pretensioning element 12 such that the elastic pretensioning element experiences elastic deformation or displacement. That is to say, such a wedge-shaped surface realizes a self-locking effect, making it possible to stably maintain a gapless state between the first sleeve and the second sleeve.

Referring to FIG. 3, the second sleeve 4 may comprise a pair of vertical walls 110 defining an opening part 100, and the wedge-shaped body 16 may further comprise a third surface 15 extending between the first wedge-shaped surface and the second mating surface; the third surface 15 may be formed as a vertical surface, so as to stably abut an inner surface of the vertical wall 110 of the second sleeve 4. The gap elimination means 10 may further comprise a cover 18, the cover 18 being fixed to the vertical wall 110 by fasteners (e.g. screws) extending through the cover. The elastic pretensioning element 12 may be formed as a spring, and preferably, the wedge-shaped body 16 may be made of a carbon fibre reinforced material, so as to reduce wear to the wedge-shaped body 16 from the intermediate element and the first sleeve 2 in the course of adjustment.

Referring to FIG. 4, the intermediate element 14 may comprise a first intermediate element and a second intermediate element arranged symmetrically at a first end and a second end of the elastic pretensioning element 12. Each of the first intermediate element and second intermediate element may be formed to have a first body part 146 and a second body part 148; the second body part 148 may be arranged at a lower side of the first body part and has a width greater than the width of the first body part, such that a step face 141 is formed between the first body part 146 and the second body part 148. A stop part 144 may be formed on a side of the intermediate element 14 that is close to the spring, the width of the stop part 144 being greater than the width of the first body part 146. It must be explained that as used herein, the term "width" means the dimension in the longitudinal direction 3.

The wedge-shaped body 16 and the intermediate element 14 may be releasably engaged with each other by means of a first mating part and a second mating part respectively formed thereon. As shown schematically in FIG. 4, the wedge-shaped body 16 may be formed with a hook 162 protruding towards the intermediate element, and the intermediate element may be formed with a recess 143; the wedge-shaped body 16 may be engaged with the intermediate element 14 by the hook 162 hooked to the recess 143, the hook 162 and the recess 143 thus forming a releasable engagement.

The process of assembling the gap elimination means 10 is described in specific terms below with reference to FIGS. 5a-5d.

Figure 5A:
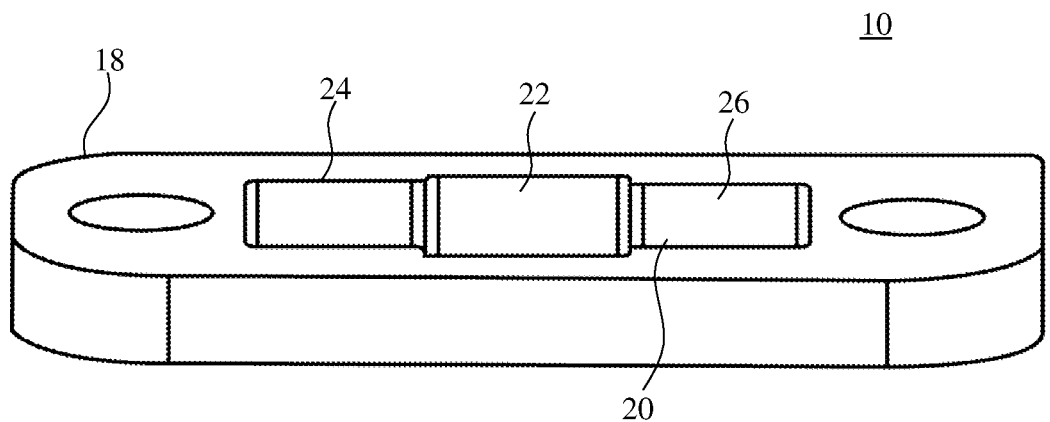
FIGS. 5a-5d are schematic drawings of the process of assembling the gap elimination means of a steering column according to an exemplary embodiment of the present disclosure.
Figure 5A:
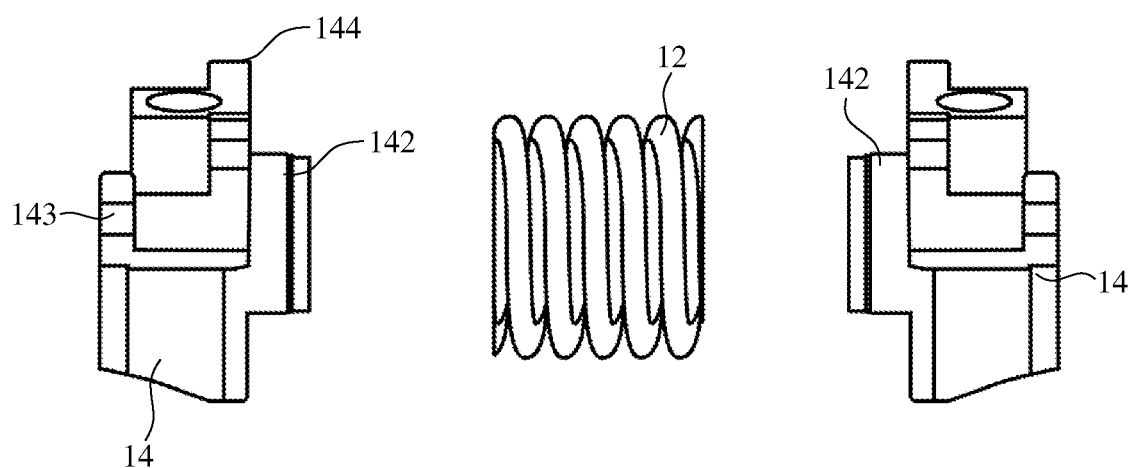
Figure 5A:
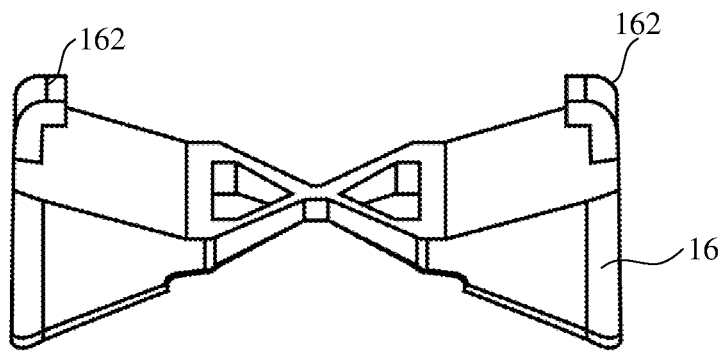
Figure 5B:
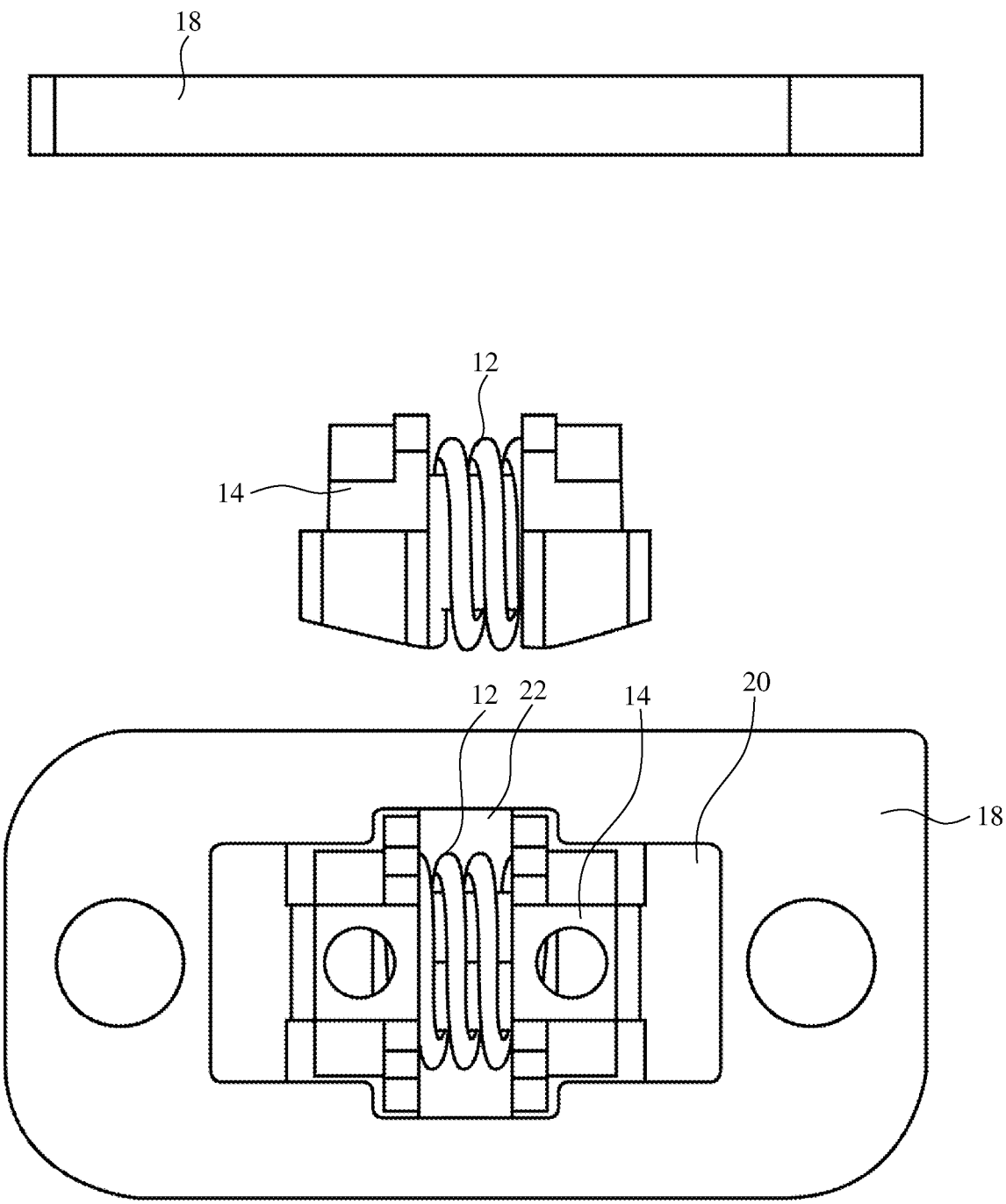
Figure 5C:
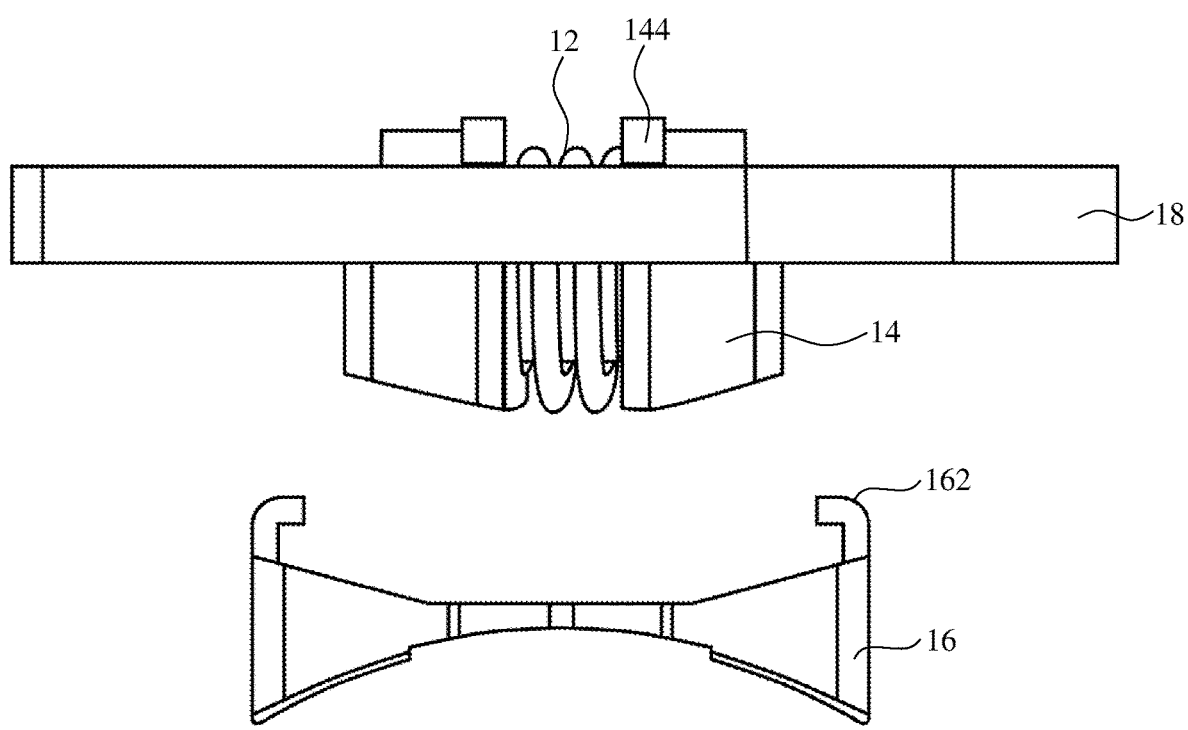
Figure 5D:
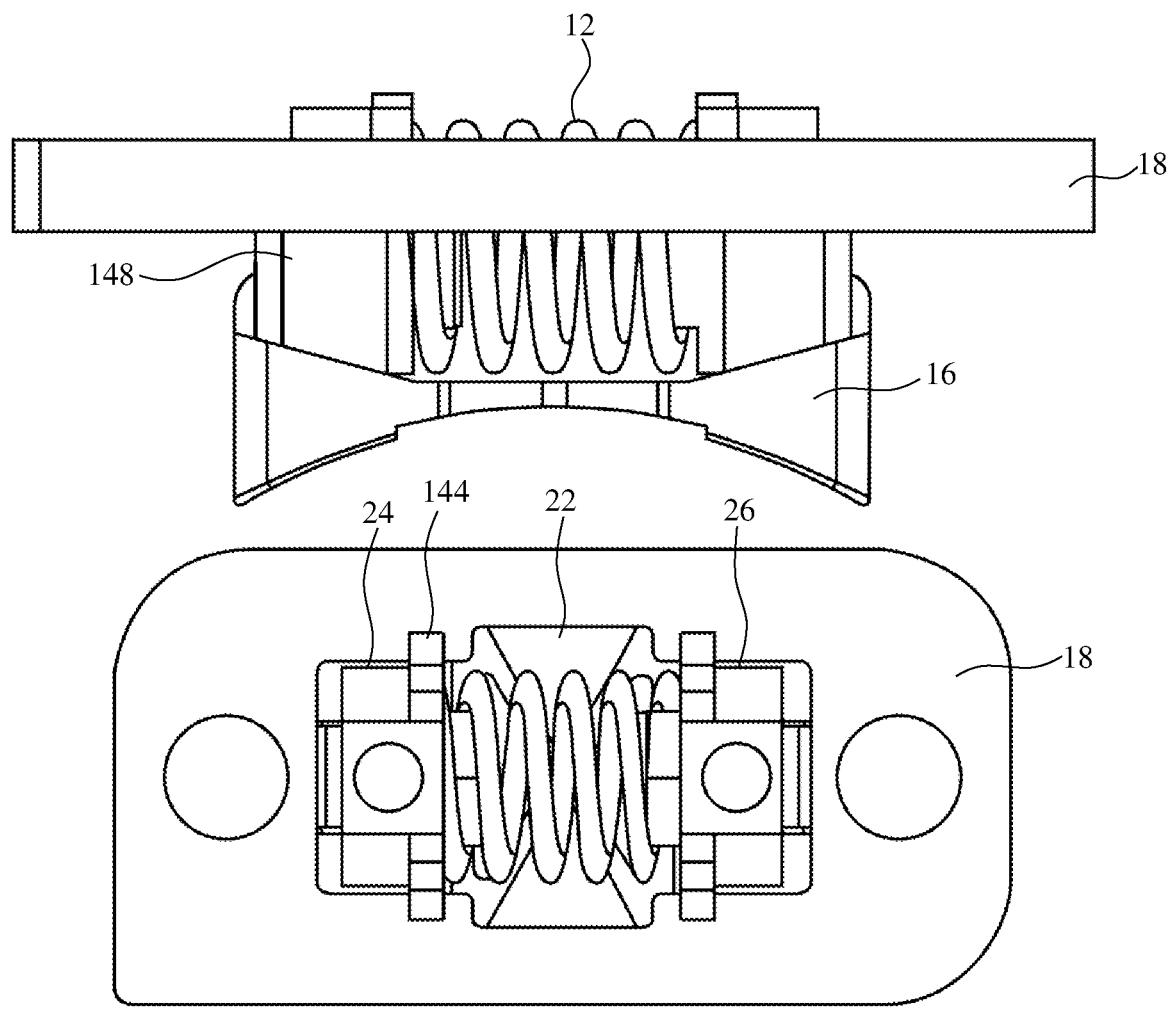
Figure 6:
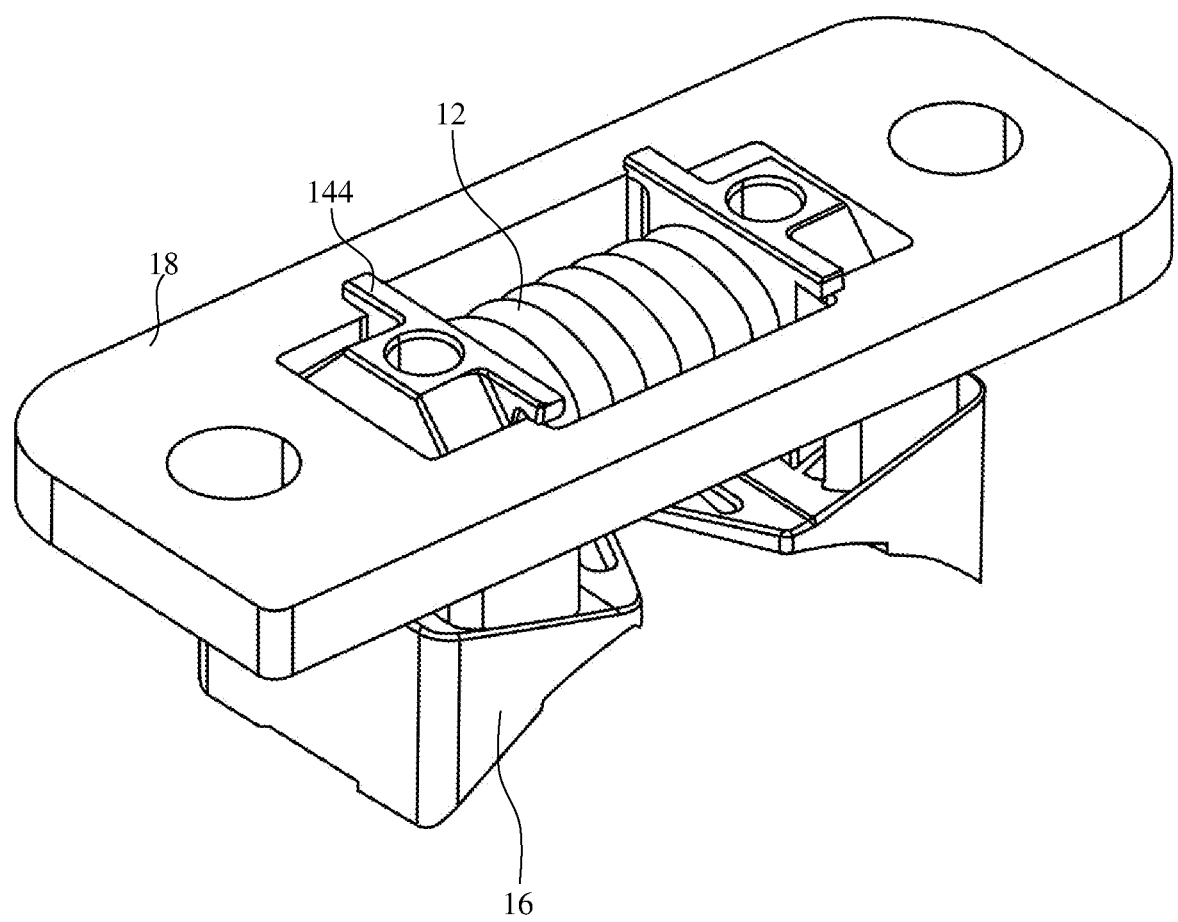
FIG. 6 is a perspective view of the gap elimination means of FIG. 4 and shown in an assembled state.

As shown in FIGS. 5a-6, the cover 18 of the gap elimination means 10 may be formed with an opening 20, which accommodates the elastic pretensioning element and the intermediate element. The opening 20 may comprise a first part 22 formed in the middle, as well as a second part 24 and a third part 26 which are respectively located at two sides of the first part 22; the width of the first part 22 may be greater than the width of the second part 24 and the width of the third part 26. The width of the stop part 144 of the intermediate element is less than or equal to the width of the first part 22, and greater than the width of the second part 24 and the width of the third part 26. The first intermediate element and second intermediate element may be formed with engagement parts 142, which are insertable into a hollow part of the spring. In the process of assembling the gap elimination means 10, firstly, the engagement parts 142 of the first intermediate element and second intermediate element are inserted into the hollow part of the spring, to connect the spring and the intermediate elements together.

Next, referring to FIG. 5b, the spring and intermediate elements that have been connected together are inserted, in a compressed state, into the first part 22 of the opening 20 of the cover 18.

Then, referring to FIG. 5c, the wedge-shaped body 16 is pressed against the intermediate elements 14 from below. The spring is then released, and as the spring is released, the first intermediate element and second intermediate element move away from each other. When the stop parts 144 move from the first part 22 to the second part 24 and the third part 26, as shown in FIG. 5d, due to the fact that the widths of the stop parts 144 are greater than the widths of the second part 24 and the third part 26, the stop parts 144 serve a stopping function, preventing the intermediate elements from moving downwards in the height direction and escaping out of the cover 18. At this time, the hooks 162 of the wedge-shaped body are hooked to the recesses 143 of the intermediate elements 14, thereby connecting the wedge-shaped body 16 to the intermediate elements 14. Furthermore, the first intermediate element and second intermediate element can move away from each other until they respectively abut an end wall of the second part 24 and an end wall of the third part 26; the end walls of the second part and third part prevent further movement of the first intermediate element and second intermediate element, which can thus be stably held in the cover.

In addition, the width of the second body parts 148 of the intermediate elements may be greater than the width of the second part 24 and the width of the third part 26, so the step faces 141 of the intermediate elements can prevent the intermediate elements from moving out of the opening of the cover 18 in the height direction. As best shown in FIGS. 5a and 5c, the wedge-shaped body 16 may comprise a first wedge-shaped body and a second wedge-shaped body corresponding to the first intermediate element and the second intermediate element, and the first wedge-shaped body and second wedge-shaped body may be elastically connected together.

FIG. 6 shows a 3D drawing of a fully assembled gap elimination means according to an exemplary embodiment of the present disclosure. When the fully assembled gap elimination means 10 is inserted into the opening part 100 of the second sleeve 4, the engagement between the wedge-shaped body 16 and the intermediate elements 14 can be released to adjust their relative positions, so as to adapt to different sizes of gap between the first sleeve and second sleeve in different steering columns. Specifically, when the fully assembled gap elimination means 10 is inserted into the opening part 100 of the second sleeve 4, the elastic pretensioning element 12 may firstly be compressed so that the hooks 162 of the wedge-shaped body 16 disengage from the recesses 143 of the intermediate elements 14; at this time, the intermediate elements 14 are able to move relative to the wedge-shaped body 16, so as to be located at positions corresponding to the corresponding gap size. The elastic pretensioning element 12 may then be released, so that the elastic pretensioning element 12 presses the wedge-shaped body 16 into abutment with the first sleeve 2 via the intermediate elements 14. Furthermore, the hook 162 and the recess 143 can limit the maximum range of movement of the intermediate element 14 and the wedge-shaped body 16 relative to each other, so as to prevent the intermediate element 14 from completely disengaging from the wedge-shaped body 16. Thus, by changing the positions of the intermediate elements 14 relative to the wedge-shaped body 16 to adapt to different gap sizes, it is possible to prevent a change in position of the cover 18 of the gap elimination means 10 in the height direction, so that the gap elimination means takes up less installation space in the height direction.

The gap elimination means 10 of the steering column according to an exemplary embodiment of the present disclosure realizes a self-locking function with the aid of a wedge-shaped structure, thus being able to stably eliminate the gap between the inner sleeve and outer sleeve. At the same time, the installation space needed for the gap elimination means and thus for the steering column can be reduced, so a compact steering column design is provided, preventing collision between the steering column and the knees of the driver in the vehicle or components such as a knee airbag.

In addition, compared with a situation in which a wedge-shaped body is directly connected to a cover via a connecting member, the gap elimination means 10 according to an exemplary embodiment of the present disclosure provides many further advantages. Specifically, when the wedge-shaped body is directly connected to the cover via the connecting member, the need for the connecting member to protrude from the cover increases the installation space taken up by the gap elimination means in the height direction, and when the position of the wedge-shaped body in the height direction is adjusted to adapt to gaps of different sizes, the position of the connecting member also changes according to the change in position of the wedge-shaped body; consequently, it is necessary to provide additional space to allow movement of the connecting member in the height direction, thus further increasing the need for installation space in the height direction. At the same time, it is necessary to provide multiple through-holes in the cover to receive connecting members, and these through-holes increase the installation space of the cover and thus of the gap elimination means in the longitudinal direction. In addition, the connecting member might easily break. In comparison, in the gap elimination means 10 according to an exemplary embodiment of the present disclosure, since the wedge-shaped body 16 is engaged with the intermediate element 14 and not connected to the cover 18, the height of the gap elimination means will not change when the height position of the wedge-shaped body is adjusted to adapt to gaps of different sizes, and such a manner of fitting can realize a flat design to the maximum extent, thereby greatly reducing the installation space needed for the gap elimination means 10 and the steering column 1, and in particular reducing the installation space needed for the gap elimination means and steering column in the height direction 5 and longitudinal direction 3. This is very beneficial in motor vehicles, because numerous components in motor vehicles take up a large amount of installation space. In particular, with regard to the steering column, it is desired that the steering column take up as little installation space as possible in the height direction, to avoid collision between the steering column and lower shell of the vehicle or a knee airbag, which would affect the safe and effective operation of the vehicle. Thus, the steering column according to an exemplary embodiment of the present disclosure can effectively save installation space, especially installation space in the height direction. In addition, the various components of the gap elimination means are able to operate durably and effectively without breaking easily, and thus can have an extended service life, providing a reliable and effective gap elimination function.

Exemplary embodiments of the steering column according to the present disclosure have been described in detail herein, but it should be understood that the present disclosure is not limited to the specific embodiments shown and described in detail above. Those skilled in the art could make various alterations and changes to the present disclosure without deviating from the substance and scope thereof. All such alterations and changes fall within the scope of the present disclosure. Furthermore, all members described herein may be replaced by other technically equivalent members.

What is claimed is:
1. A steering column, comprising:
a first sleeve;
a second sleeve, the first sleeve being received in the second sleeve in a telescopic way in a longitudinal direction; and
a gap elimination means comprising:
an elastic pretensioning element and a wedge-shaped body, the wedge-shaped body having a first wedge-shaped surface and a second mating surface; and
an intermediate element, the intermediate element having a third wedge-shaped surface which abuts the first wedge-shaped surface and has a shape fitted to the shape of the first wedge-shaped surface, and the pretensioning element applies a pressing force to the wedge-shaped body via the intermediate element such that the second mating surface of the wedge-shaped body abuts an outer peripheral surface of the first sleeve;
wherein the elastic pretensioning element is arranged in a tangential direction of the first sleeve and applies a pressing force to the intermediate element in the tangential direction, and the intermediate element and the wedge-shaped body apply a force to the first sleeve in a radial direction under the action of the pressing force;
wherein the intermediate element is provided with a first mating part and the wedge-shaped body is provided with a second mating part, the intermediate element and the wedge-shaped body being releasably engaged by means of the first mating part and the second mating part, and the first mating part and the second mating part defining a maximum range of movement of the intermediate element and the wedge-shaped body relative to each other;
wherein the first mating part comprises at least one hook protruding towards the intermediate element, and the second mating part is formed as a recess, the hook and the recess forming a releasable engagement.

2. The steering column of claim 1, wherein the gap elimination means further comprises a cover, the cover being formed with an opening that accommodates the elastic pretensioning element and the intermediate element.

3. The steering column of claim 1, wherein the intermediate element comprises a first intermediate element arranged at a first end of the elastic pretensioning element and a second intermediate element arranged at a second end of the elastic pretensioning element, the second end and the first end being located at opposite sides of the elastic pretensioning element.

4. The steering column of claim 3, wherein the elastic pretensioning element is formed as a spring, and the first intermediate element and the second intermediate element are each formed with an engagement part which is insertable into a hollow part of the spring.

5. The steering column of claim 3, wherein the wedge-shaped body comprises a first wedge-shaped body and a second wedge-shaped body connected to each other.

6. The steering column of claim 3, wherein the gap elimination means is disposed in an opening part of the second sleeve, the opening part being defined by a vertical wall, and the wedge-shaped body also has a third surface, which is formed as a vertical surface and faces the vertical wall.

7. The steering column of claim 1, wherein the first sleeve has an outer circular cross-section and cylindrical shape and the second sleeve has an inner circular cross-section and cylindrical shape.

8. A steering column, comprising:
a first sleeve;
a second sleeve, the first sleeve being received in the second sleeve in a telescopic way in a longitudinal direction; and
a gap elimination means comprising:
an elastic pretensioning element and a wedge-shaped body, the wedge-shaped body having a first wedge-shaped surface and a second mating surface; and
an intermediate element, the intermediate element having a third wedge-shaped surface which abuts the first wedge-shaped surface and has a shape fitted to the shape of the first wedge-shaped surface, and the pretensioning element applies a pressing force to the wedge-shaped body via the intermediate element such that the second mating surface of the wedge-shaped body abuts an outer peripheral surface of the first sleeve;
wherein the gap elimination means further comprises a cover, the cover being formed with an opening that accommodates the elastic pretensioning element and the intermediate element;
wherein the opening has a first part formed in the middle, and a second part and a third part respectively located at two sides of the first part, the width of the first part being greater than the widths of the second part and the third part in the longitudinal direction, and the intermediate element is provided with a stop part, the width of the stop part being equal to or less than the width of the first part and greater than the width of the second part and the width of the third part.

9. The steering column of claim 8, wherein the intermediate element comprises a first body part and a second body part arranged in a height direction, the width of the first body part being less than the width of the second part and the width of the third part, and the width of the second body part being greater than the width of the first body part, such that a step face is formed between the first body part and the second body part.

10. The steering column of claim 9, wherein the step face abuts a lower surface of the cover when the first body part and the second body part of the intermediate element are inserted into the opening of the cover.

11. The steering column of claim 8, wherein:
the elastic pretensioning element is arranged in a tangential direction of the first sleeve and applies a pressing force to the intermediate element in the tangential direction, and the intermediate element and the wedge-shaped body apply a force to the first sleeve in a radial direction under the action of the pressing force;
the intermediate element is provided with a first mating part and the wedge-shaped body is provided with a second mating part, the intermediate element and the wedge-shaped body being releasably engaged by means of the first mating part and the second mating part, and the first mating part and the second mating part defining a maximum range of movement of the intermediate element and the wedge-shaped body relative to each other; and
the first mating part comprises at least one hook protruding towards the intermediate element, and the second mating part is formed as a recess, the hook and the recess forming a releasable engagement.

12. The steering column of claim 11, wherein:
the first sleeve has an outer circular cross-section and cylindrical shape; and
the second sleeve has an inner circular cross-section and cylindrical shape.

* * * * *